(12) United States Patent
Yoshihara

(10) Patent No.: US 11,648,600 B2
(45) Date of Patent: May 16, 2023

(54) MANUFACTURING METHOD OF CASING

(71) Applicant: MITSUBISHI HEAVY INDUSTRIES COMPRESSOR CORPORATION, Tokyo (JP)

(72) Inventor: Taishi Yoshihara, Hiroshima (JP)

(73) Assignee: MITSUBISHI HEAVY INDUSTRIES COMPRESSOR CORPORATION, Tokyo (JP)

(*) Notice: Subject to any disclaimer, the term of this patent is extended or adjusted under 35 U.S.C. 154(b) by 22 days.

(21) Appl. No.: 17/393,522

(22) Filed: Aug. 4, 2021

(65) Prior Publication Data
US 2022/0080487 A1 Mar. 17, 2022

(30) Foreign Application Priority Data
Sep. 15, 2020 (JP) .............................. JP2020-154460

(51) Int. Cl.
*B21D 28/26* (2006.01)
*F04D 29/44* (2006.01)
*B23C 3/04* (2006.01)

(52) U.S. Cl.
CPC ............... *B21D 28/26* (2013.01); *B23C 3/04* (2013.01); *F04D 29/44* (2013.01); *B23C 2270/18* (2013.01)

(58) Field of Classification Search
None
See application file for complete search history.

(56) References Cited

U.S. PATENT DOCUMENTS

| 4,028,992 | A  | * | 6/1977  | Kuehnle .................. | B23Q 1/48    |
|           |    |   |         |                          | 409/199      |
| 5,779,406 | A  | * | 7/1998  | Astor ..................... | F04D 29/441  |
|           |    |   |         |                          | 409/199      |
| 6,631,771 | B2 | * | 10/2003 | Hamamura ............. | B23B 35/00   |
|           |    |   |         |                          | 279/6        |
| 8,181,555 | B2 | * | 5/2012  | Clements ................ | B23P 6/002   |
|           |    |   |         |                          | 82/70.2      |
| 9,044,814 | B2 |   | 6/2015  | Wilmot                   |              |
| 9,273,631 | B2 | * | 3/2016  | Vavalle ................. | B29C 70/545  |

(Continued)

FOREIGN PATENT DOCUMENTS

| CN | 108655477  | A  | 10/2018 |
| DE | 3540358    | A1 | 5/1987  |
| JP | S59-182011 | A  | 10/1984 |

(Continued)

*Primary Examiner* — Jacob J Cigna
(74) *Attorney, Agent, or Firm* — Osha Bergman Watanabe & Burton LLP

(57) ABSTRACT

A manufacturing method of a casing includes a step of preparing a casing forming member that includes a casing body forming portion which is formed in a tubular shape and a protruding portion forming portion which protrudes from the casing body forming portion toward an outer side in a radial direction, a step of placing the casing forming member on a table which is rotatable about a table axis which extends in a vertical direction and disposing a tool which is rotatable about a tool axis on an inner side of the casing forming member in the radial direction, and a step of forming the casing by performing cutting an inner circumferential surface of the casing forming member with the tool while rotating the table about the table axis together with the casing forming member and rotating the tool about the tool axis.

4 Claims, 9 Drawing Sheets

(56) References Cited

U.S. PATENT DOCUMENTS

2009/0324350 A1* 12/2009 Clements .......... B23B 29/03489
                                                                                                                 408/103
2018/0372121 A1    12/2018  Higuchi

FOREIGN PATENT DOCUMENTS

| JP | 2001-239409 A | 9/2001 | | |
|---|---|---|---|---|
| WO | 2017-094064 A1 | 6/2017 | | |
| WO | WO-2020187562 A1 * | 9/2020 | ............. | F04D 1/063 |

* cited by examiner

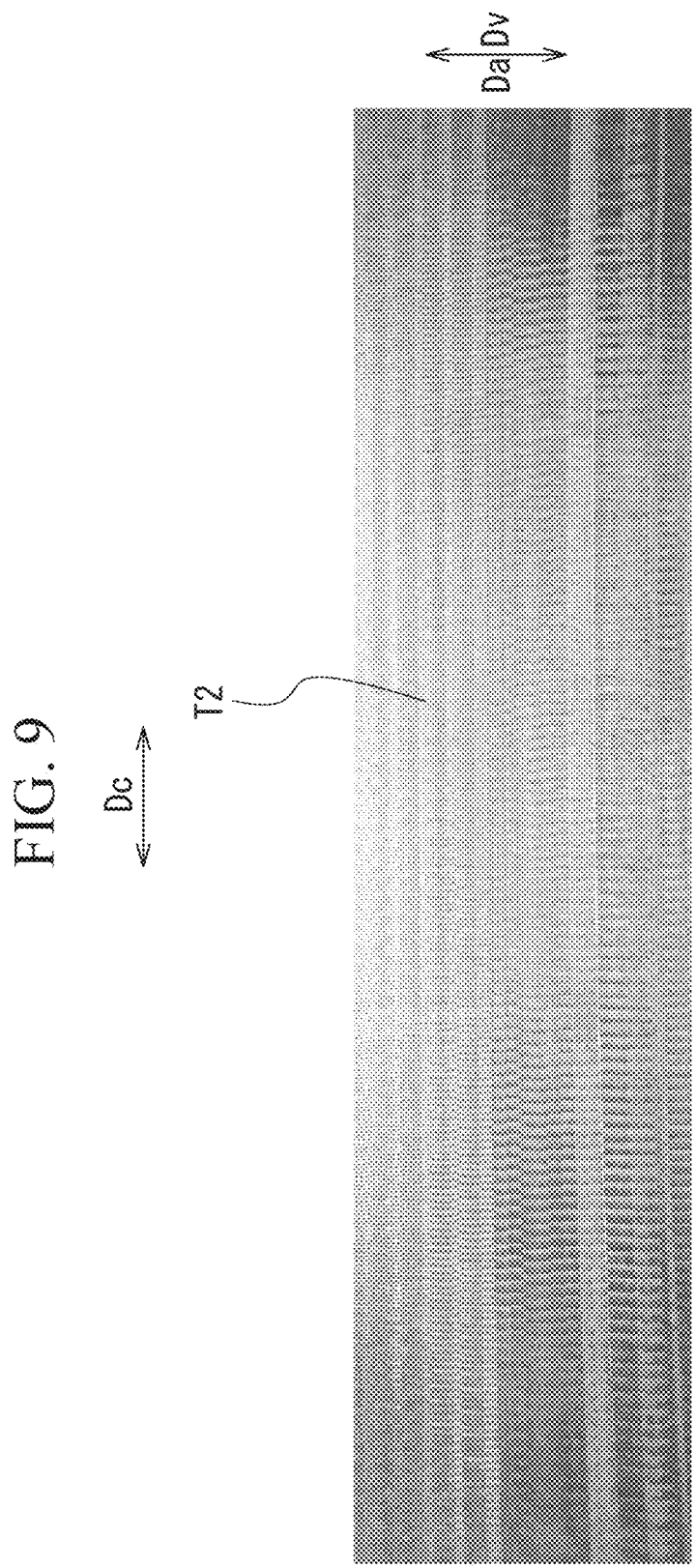

MANUFACTURING METHOD OF CASING

BACKGROUND OF THE INVENTION

Field of the Invention

The present disclosure relates to a manufacturing method of a casing.

Priority is claimed on Japanese Patent Application No. 2020-154460, filed Sep. 15, 2020, the content of which is incorporated herein by reference.

Description of Related Art

PCT International Publication No. WO2017/094064 discloses a centrifugal compressor that includes a casing which is formed in a tubular shape and can accommodate a rotor therein. With this configuration, the casing is integrally formed with a suction nozzle or an ejecting nozzle to protrude to an outer side in a radial direction from a body portion of the casing formed in a cylindrical shape.

In order to manufacture such a casing, turning processing is generally used. In the turning processing, a table on which a workpiece is placed, which is the body portion of the casing formed in a tubular shape in advance, is rotated at high speed around a vertical axis. As a result, the workpiece rotates at high speed around the vertical axis together with the table. In this state, a tool is inserted into the workpiece formed in a tubular shape on an inner side in the radial direction, and a distal end of the tool is pressed against an inner circumferential surface of the workpiece. As a result, the inner circumferential surface of the workpiece which rotates around the vertical axis is moved relative to the distal end of the tool, and the inner circumferential surface of the workpiece is subjected to cutting.

SUMMARY OF THE INVENTION

Incidentally, as described above, the suction nozzle or the ejecting nozzle which protrudes from an outer circumferential surface of the workpiece is formed in the casing. In a case in which the casing is large, the weight of the suction nozzle or the ejecting nozzle is very large. Therefore, in some cases, the center of gravity of the workpiece itself is eccentric and deviates from a center axis due to the suction nozzle or the ejecting nozzle. In a case in which the table is rotated at high speed for the turning processing on such a workpiece, a large centrifugal force acts on the workpiece in an eccentric state due to the suction nozzle or ejecting nozzle which is a heavy object. As a result, the balance of the workpiece which rotates at a high speed may be greatly lost, and the processing accuracy may not be ensured. Therefore, in order to ensure the balance during processing of the eccentric workpiece, it is necessary to suppress the rotation speed of the table to suppress the influence of the centrifugal force generated by the suction nozzle or the ejecting nozzle. However, in a case in which the rotation speed of the table is suppressed, the time required for the processing is increased.

The present disclosure provides a manufacturing method of a casing, in which, even with a large casing, the processing time can be suppressed while suppressing the imbalance during the processing.

A manufacturing method of a casing according to an aspect of the present disclosure is a manufacturing method of a casing that includes a casing body which is formed in a tubular shape that is centered on and extends along an axis, and a suction nozzle and a discharge nozzle which protrude from the casing body toward an outer side in a radial direction of the casing body about the axis as a reference and communicate with an inside of the casing body, the method including a step of preparing a casing forming member that includes a casing body forming portion which is formed in a tubular shape and a protruding portion forming portion which protrudes from the casing body forming portion toward the outer side in the radial direction, a step of placing the casing forming member on a table which is rotatable about a table axis which extends in a vertical direction and disposing a tool which is rotatable about a tool axis on an inner side of the casing forming member in the radial direction, and a step of forming the casing by performing cutting an inner circumferential surface of the casing forming member with the tool while rotating the table about the table axis together with the casing forming member and rotating the tool about the tool axis.

With the manufacturing method of the casing according to the present disclosure, even with a large casing, it is possible to suppress the processing time while suppressing the imbalance during the processing.

BRIEF DESCRIPTION OF THE DRAWINGS

FIG. 9 is a view showing a processing mark which is formed on the inner circumferential surface of the casing body forming portion formed by the tool of the modification example in the manufacturing method of the casing according to the embodiment.

DETAILED DESCRIPTION OF THE INVENTION

Hereinafter, a mode for carrying out a manufacturing method of a casing according to the present disclosure will be described with reference to the accompanying drawings. However, the present disclosure is not limited to the embodiments.

Configuration of Casing

Figure 1:
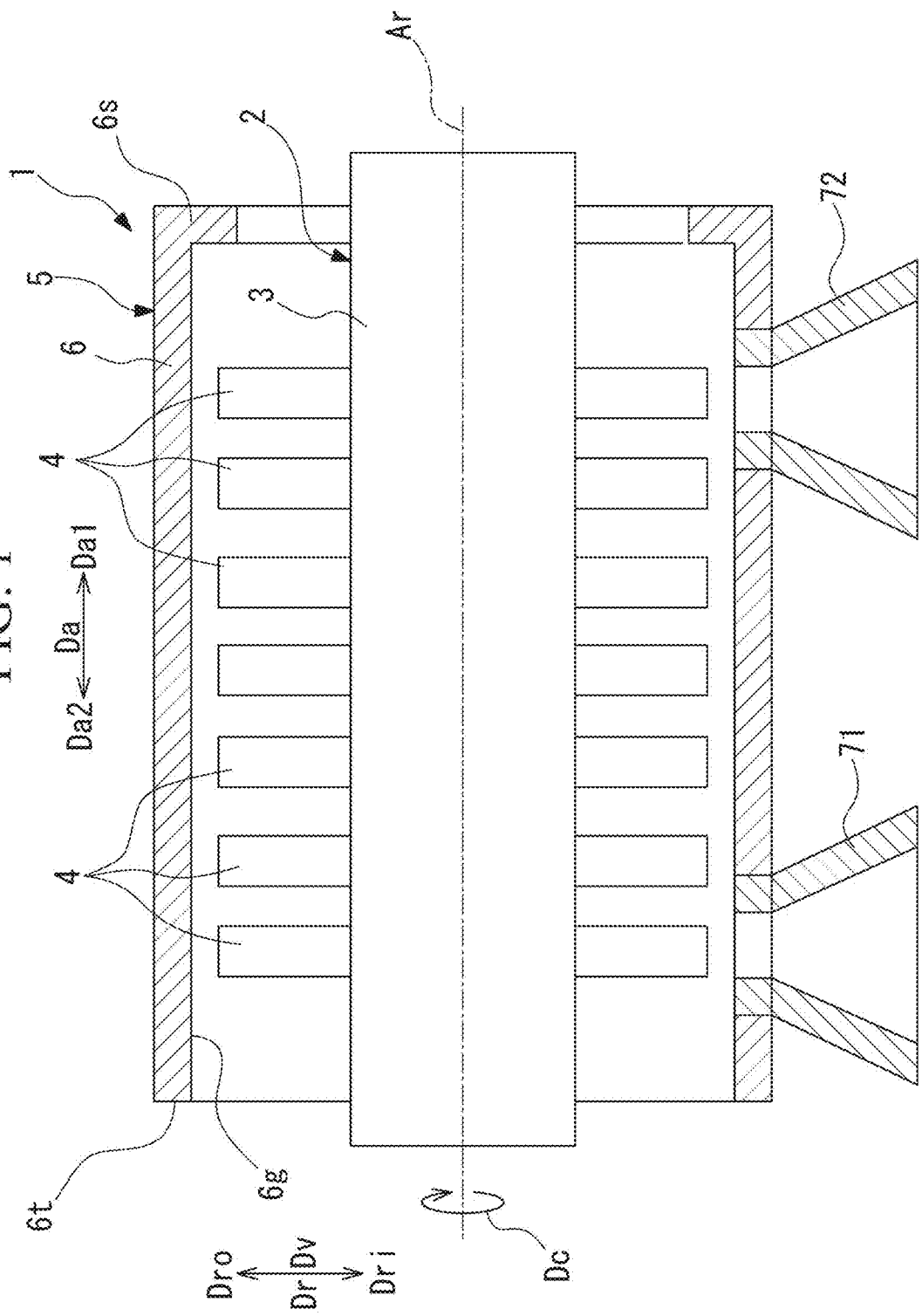
FIG. 1 is a cross-sectional view showing a schematic configuration of a casing manufactured according to a manufacturing method of the casing according to an embodiment of the present disclosure.

As shown in FIG. 1, a casing 5 configures a part of a rotating machine 1. The rotating machine 1 mainly includes a rotor 2 and the casing 5. In an embodiment of the present disclosure, the rotating machine 1 is, for example, a multi-stage type centrifugal compressor.

The rotor 2 includes a rotor body 3 and a plurality of impellers 4. The rotor body 3 extends in an axial direction Da of an axis Ar. The rotor body 3 is centered on the axis Ar and rotatably supported by a bearing portion (not shown).

In the following, a direction in which the axis Ar extends is referred to as the axial direction Da. A radial direction of a rotating machine 1 (a casing body 6) about the axis Ar as a reference is simply referred to as a radial direction Dr. A direction around the rotor 2 centered on the axis Ar is defined as a circumferential direction Dc.

The plurality of impellers 4 are arranged at intervals in the axial direction Da. Each of the impellers 4 is fixed to the rotor body 3 on the outer side in the radial direction Dr. Each of the impellers 4 can rotate about the axis Ar integrally with the rotor body 3.

The casing 5 is disposed to cover the rotor 2. The casing 5 includes a casing body 6, a suction nozzle 71, and a discharge nozzle 72. The casing body 6 is formed in a tubular shape extending in the axial direction Da of the axis Ar. The suction nozzle 71 and the discharge nozzle 72 protrude from the casing body 6 toward an outer side Dro in the radial direction Dr. In the present embodiment, the suction nozzle 71 guides the working fluid which is supplied from the outside to the inside of the casing body 6. The discharge nozzle 72 discharges the working fluid which has flowed inside the casing body 6 to the outside.

Procedure of Manufacturing Method of Casing

Figure 2:
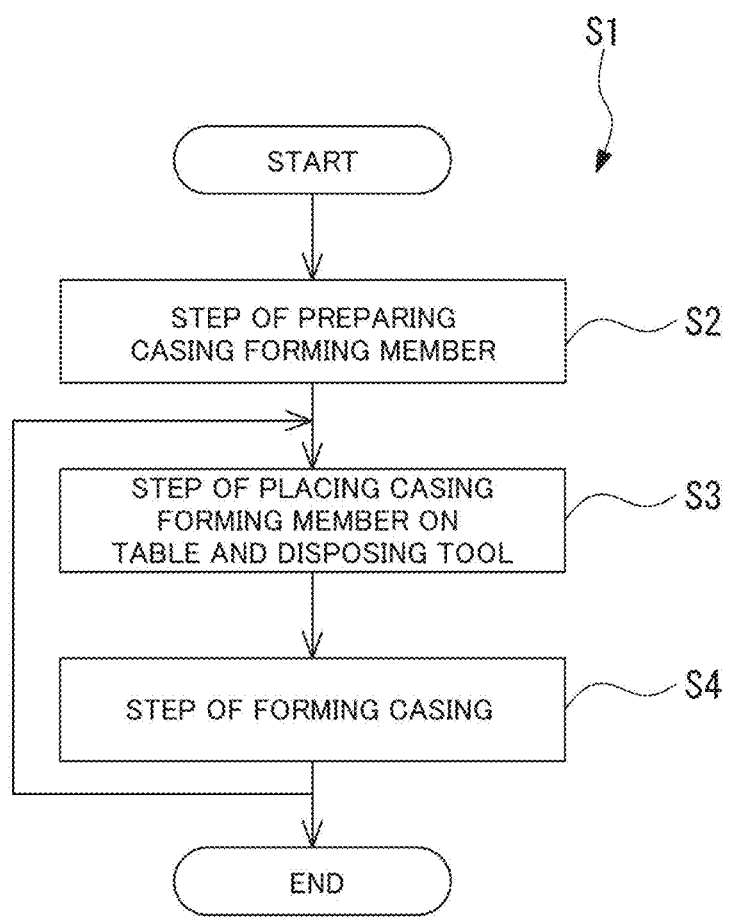
FIG. 2 is a flowchart showing a procedure of the manufacturing method of the casing according to the embodiment of the present disclosure.

The casing 5 described above is formed by cutting a casing forming member 100 (see FIG. 3) formed in advance into a predetermined shape. As shown in FIG. 2, a manufacturing method S1 of the casing 5 includes a step S2 of preparing the casing forming member 100, a step S3 of placing the casing forming member 100 on a table 21 and disposing a tool 22, and a step S4 of forming the casing 5.

Figure 3:
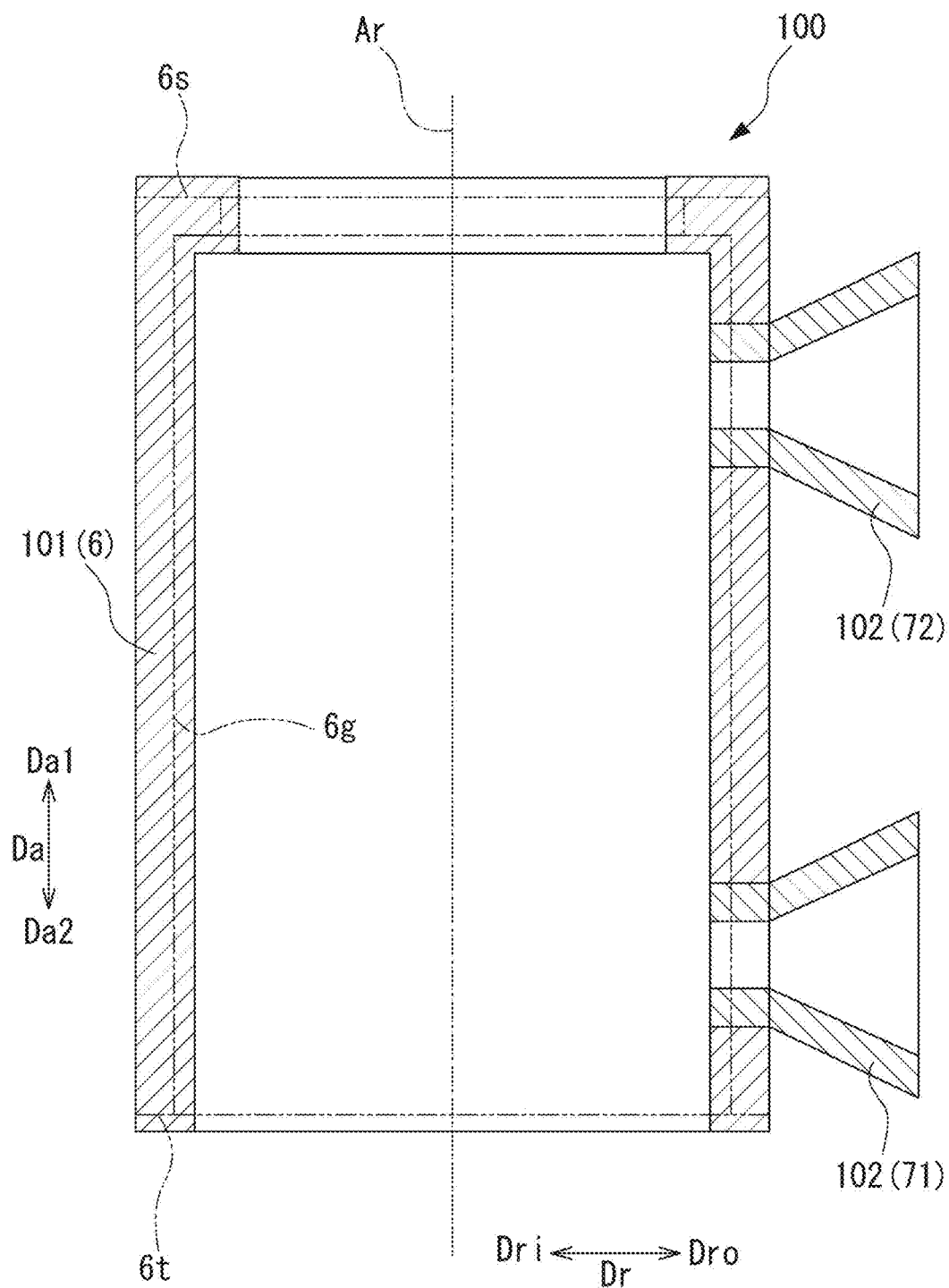
FIG. 3 is a cross-sectional view showing a casing forming member which is prepared in advance in a step of preparing the casing forming member.

In step S2 of preparing the casing forming member 100, as shown in FIG. 3, the casing forming member 100 is prepared. The casing forming member 100 includes a casing body forming portion 101 in which the casing body 6 is formed, and a protruding portion forming portion 102 in which a protruding portion which protrudes from the casing body 6 such as the suction nozzle 71 or the discharge nozzle 72 is formed. The casing body forming portion 101 becomes the casing body 6 by being subjected to a predetermined processing. The casing body forming portion 101 is formed in a tubular shape extending in the axial direction Da of the axis Ar. The protruding portion forming portion 102 becomes the suction nozzle 71 or the discharge nozzle 72 by being subjected to a predetermined processing. The protruding portion forming portion 102 protrudes from the casing body forming portion 101 toward the outer side Dro in the radial direction Dr.

Figure 4:
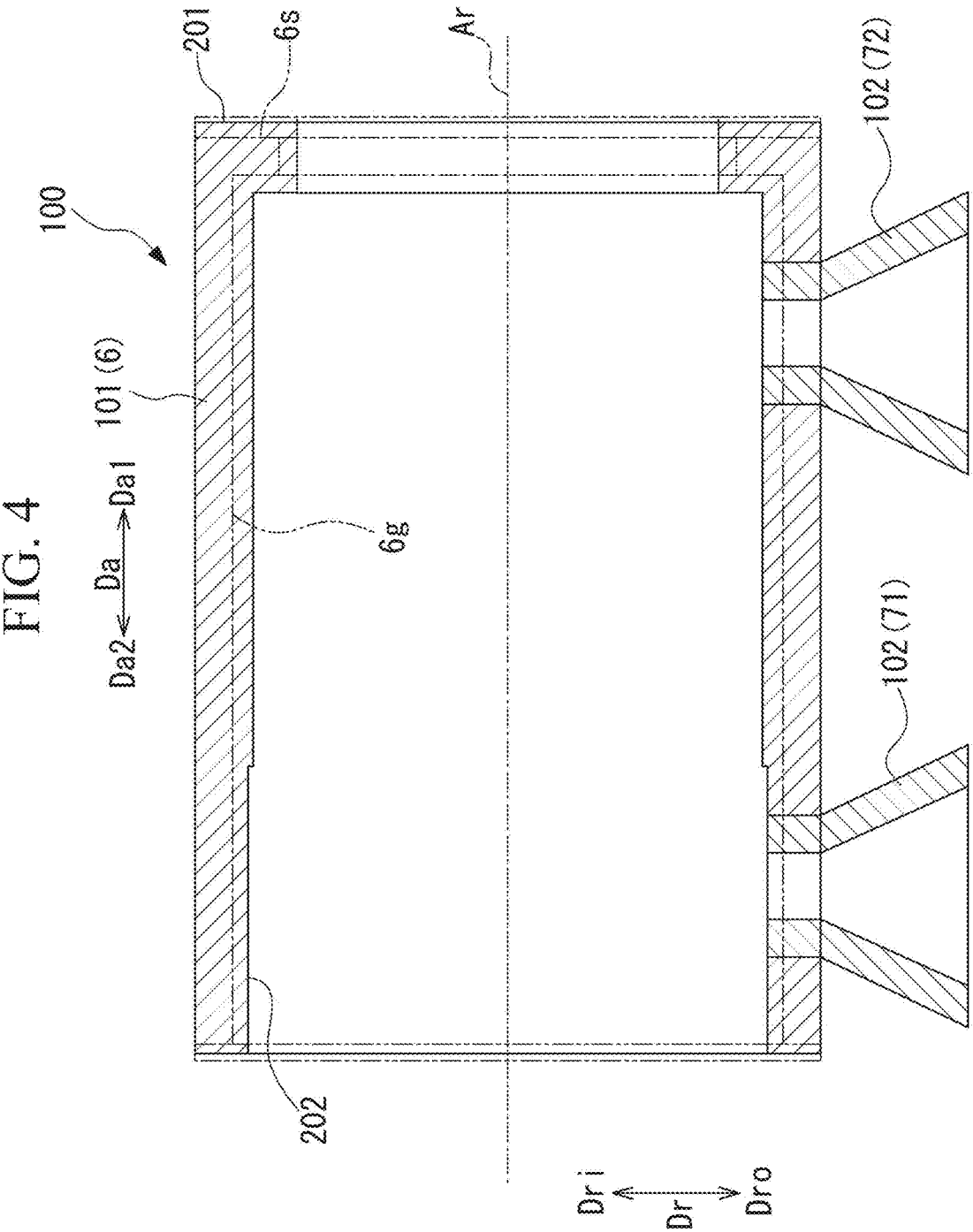
FIG. 4 is a cross-sectional view showing a state in which a first reference surface and a second reference surface are formed on an end surface of the casing.

The casing forming member 100 is formed into a predetermined shape close to the shape of the casing 5 by, for example, casting, forging, steel plate welding assembly, a laminating shaping method, or the like. In step S2 of preparing the casing forming member 100, as shown in FIG. 4, an end surface of the casing body forming portion 101 on a first side Da1 (first end of the casing body forming portion 101) in the axial direction Da of the casing forming member 100 which is formed in the predetermined shape is cut. As a result, a first reference surface 201, which serves as a reference when the casing body forming portion 101 is processed, is formed. Here, the first reference surface 201 is formed by leaving a cutting allowance with a thickness of, for example, several mm on an end surface 6s (see FIG. 1) of the finally formed casing body 6 on the first side Da1 in the axial direction Da. Further, in step S2 of preparing the casing forming member 100, an inner circumferential surface 101g of the casing body forming portion 101 is cut from a second side Da2 (second end of the casing body forming portion 101) in the axial direction Da of the casing body forming portion 101. As a result, a second reference surface 202 for centering the casing body forming portion 101 is formed. Here, the second reference surface 202 is formed by leaving a cutting allowance with a thickness of, for example, several mm on an inner circumferential surface 6g of the casing body 6 of the finally formed casing 5.

Figure 5:
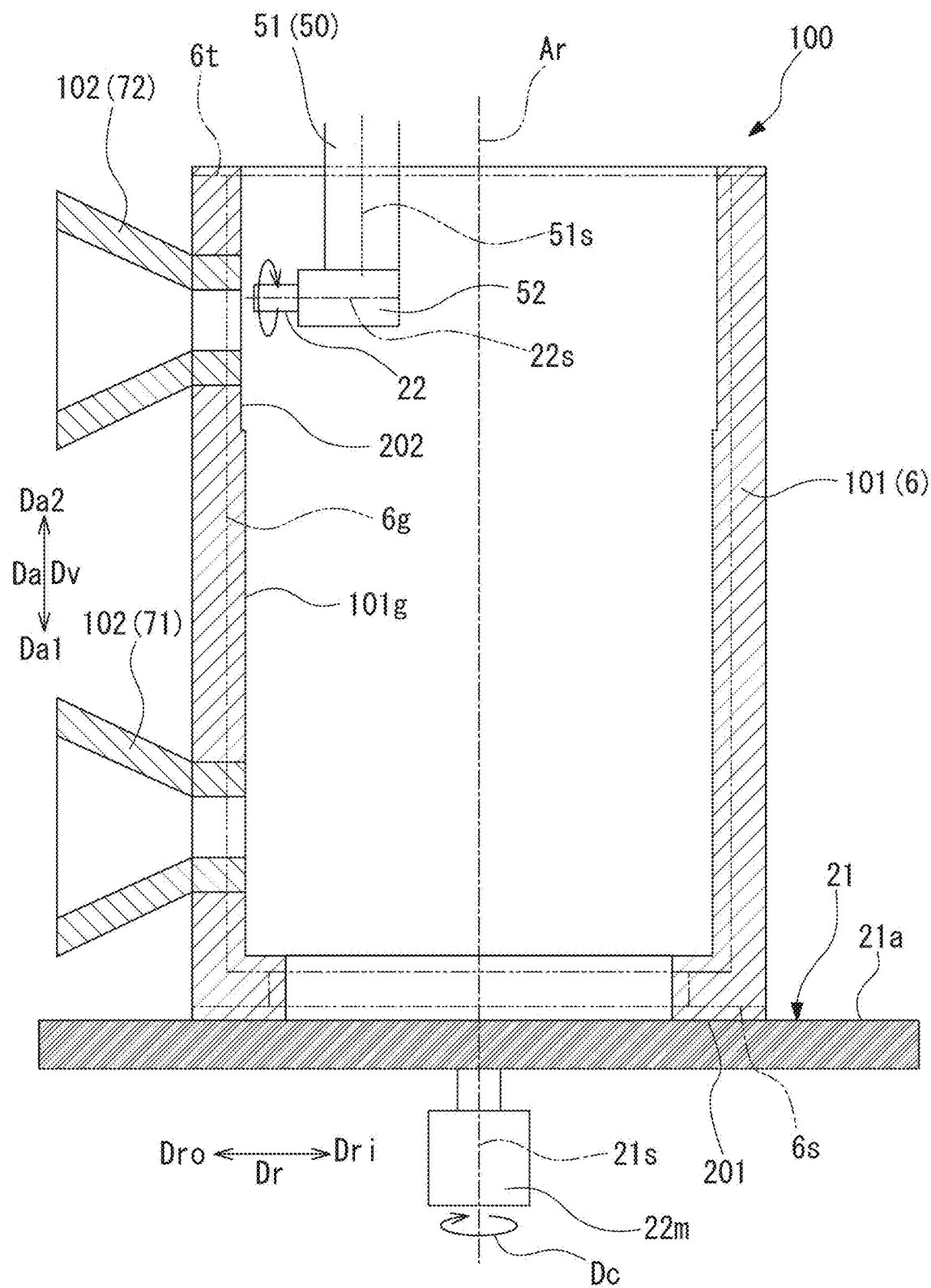
FIG. 5 is a cross-sectional view showing a step of forming the casing.

In step S3 of placing the casing forming member 100 on the table 21 and disposing the tool 22, the casing forming member 100 is placed on the table 21 in a state in which the axis Ar and a table axis 21s coincide with each other, as shown in FIG. 5. The table 21 is formed, for example, in a circular shape as viewed from a vertical direction Dv. The table 21 has a placing surface 21a orthogonal to the vertical direction Dv. The table 21 is configured to be rotatable about the table axis 21s which extends in the vertical direction Dv. The table 21 is rotationally driven about the table axis 21s by a table drive mechanism 22m provided with a motor, a speed reducer, and the like.

The casing forming member 100 is installed in a state in which the first reference surface 201 formed in step S2 is in contact with the placing surface 21a. In this case, the casing body forming portion 101 is disposed to be centered such that the table axis 21s and the axis Ar are coaxial with each other by using the second reference surface 202.

In step S4 of forming the casing 5, while the table 21 is rotated, the inner circumferential surface 101g of the casing body forming portion 101 is subjected to the cutting by the tool 22 to form the casing body 6. The table 21 is rotated about the table axis 21s by the table drive mechanism 22m at a table rotation speed (table rotation speed) which is set in advance. As a result, the casing forming member 100 rotates about the table axis 21s together with the table 21 in the circumferential direction Dc.

Further, in step S4, the tool 22 is inserted into the casing body forming portion 101 placed on the table 21 on an inner side Dri in the radial direction Dr. The tool 22 is inserted into the casing body forming portion 101 on the inner side Dri in the radial direction Dr upward in the vertical direction Dv, that is, to the casing body forming portion 101 toward the first side Da1 from the second side Da2 in the axial direction Da.

The tool 22 is held by a main spindle 51 of a processing machine 50. The main spindle 51 is movably supported by a main spindle moving mechanism (not shown) in the vertical direction Dv and the radial direction Dr of the casing body forming portion 101 orthogonal to the vertical direction Dv. The main spindle 51 is rotationally driven about an operation axis 51s which extends in the vertical direction Dv by a main spindle rotation drive mechanism (not shown) provided with a motor, a speed reducer, or the like. The tool 22 is connected to the main spindle 51 via a head 52. In the present embodiment, the tool 22 is held by the main spindle 51 via the head 52 such that the tool axis 22s extends in the radial direction Dr. That is, the head 52 converts the rotation of the main spindle 51 into the rotation in the horizontal direction like the right angle head. As a result, the tool 22 extends such that the tool axis 22s intersects with (is orthogonal to) the table axis 21s. The head 52 transmits the rotation of the main spindle 51 to the tool axis 22s of the tool 22 via a gear (not shown) or the like. The tool 22 disposed on the casing body forming portion 101 on the inner side Dri in the radial direction Dr is orthogonal to the axis Ar and is rotated about the tool axis 22s which extends in the radial direction Dr at the tool rotation speed (tool rotation speed) which is set in advance.

Here, the tool rotation speed of the tool 22 which is set in advance is set to be higher than the table rotation speed of the table 21. Therefore, the table 21 rotates more slowly than the tool 22. In this case, the table rotation speed of the table 21 is preferably, for example, 0 rpm or more and 1 rpm or less. It is more preferable that the table rotation speed be as close as possible to 0.1 rpm.

It is preferable that the tool rotation speed of the tool 22 be appropriately set such that desired cutting at the cutting speed at the cutting edge of the tool 22 can be satisfactorily performed on the casing forming member 100 that rotates together with the table 21 at the table rotation speed described above. That is, the tool rotation speed is set such that the relative speed of the tool 22 with respect to the table 21 becomes the desired cutting speed. For example, the tool rotation speed which is the rotation speed of the tool 22 is about 500 rpm.

In step S4 of forming the casing 5 in a state in which the table 21 and the tool 22 are rotated as described above, the casing body forming portion 101 is subjected to the cutting by the tool 22. Specifically, the casing forming member 100 is rotated by the table drive mechanism 22m together with the table 21 at a predetermined table rotation speed, and the main spindle 51 is moved by the main spindle moving mechanism (not shown) to a predetermined position. In this state, the distal end of the tool 22 which rotates around the tool axis 22s is pressed against the inner circumferential surface 101g of the casing body forming portion 101. As a result, the rotating tool 22 is moved relative to the inner circumferential surface 101g of the casing body forming portion 101 in the circumferential direction Dc around the table axis 21s. Further, the tool 22 is moved by the main spindle moving mechanism (not shown) together with the main spindle 51 in the vertical direction Dv at a movement speed set in advance. As a result, the inner circumferential surface 101g of the casing body forming portion 101 is cut by the tool 22 at intervals of one circumference/pitch centered on the table axis 21s, and is intermittently cut. Further, by returning the process to step S3 and vertically inverting the direction of the axial direction Da of the casing body forming portion 101 in the middle to carry out step S4, the inner circumferential surface 101g of the casing body forming portion 101 is processed from both sides in the axial direction Da. By performing the processing while changing the direction of the casing body forming portion 101 in this way, roughing processing or finishing processing is performed, and the casing body 6 which has a predetermined dimension is formed.

The suction nozzle 71 or the discharge nozzle 72 is formed by performing various processing such as serration processing and drilling processing on the protruding portion forming portion 102 at any timing. Therefore, the suction nozzle 71 or the discharge nozzle 72 may be formed in step S2 of preparing before step S3, may be formed in the middle of step S4 of forming the casing 5 as in the middle of vertical inversion of the casing forming member 100, or may be formed after step S4 of forming the casing 5.

About Processing Mark Formed in Casing

Figure 6:
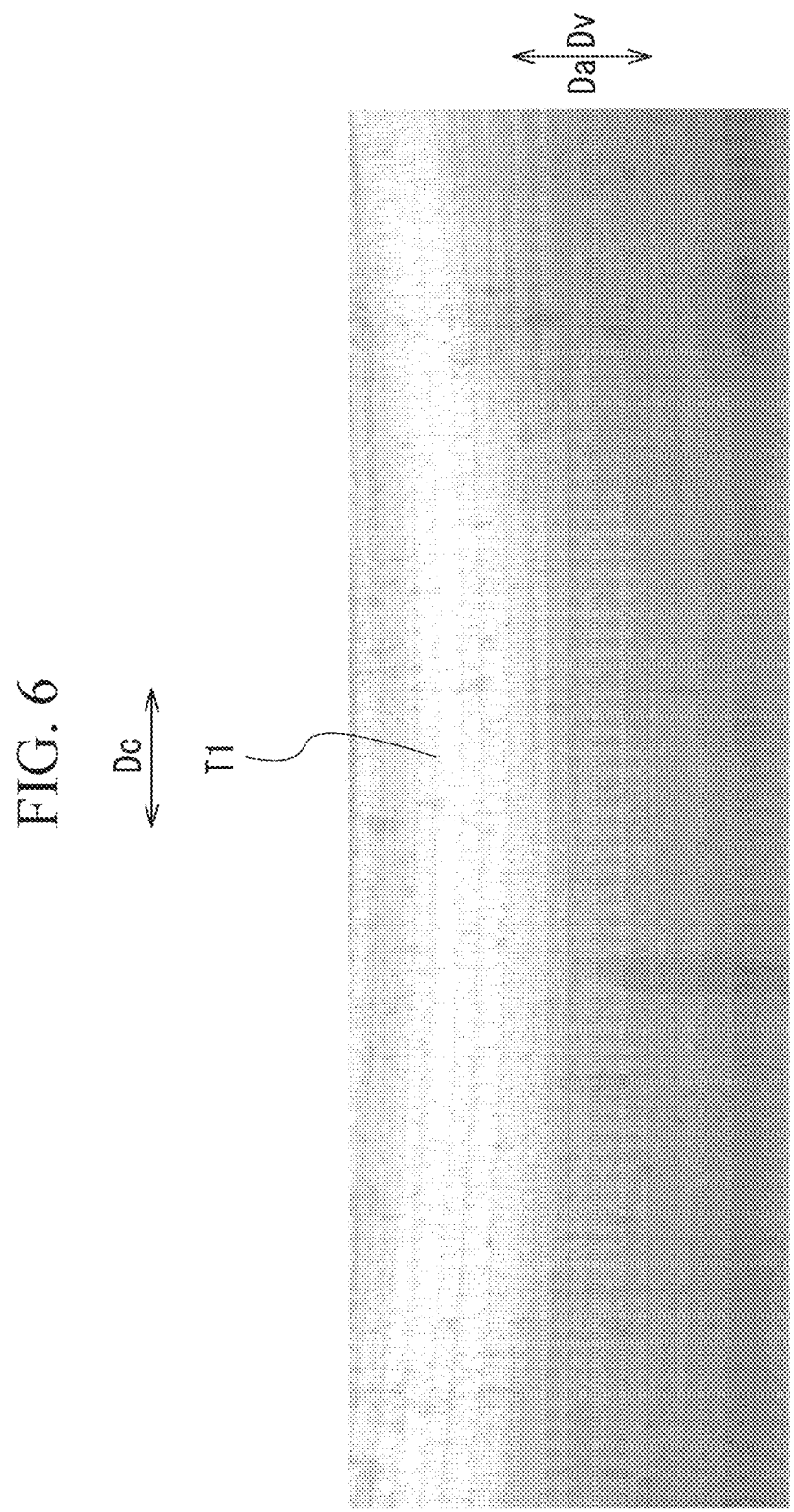
FIG. 6 is a view showing a processing mark which is formed on an inner circumferential surface of a casing body forming portion formed by the manufacturing method of the casing according to the embodiment.

As described above, in a case in which the cutting is performed on the inner circumferential surface 101g of the casing body forming portion 101 by rotating the tool 22 while rotating the casing forming member 100 together with the table 21, as shown in FIG. 6, a processing mark T1 is formed. In this processing mark T1, an arcuate cut mark peculiar to so-called milling, in which the cutting is performed while rotating the tool 22 around the tool axis 22s which extends in the radial direction Dr, remains. Further, by rotating the casing forming member 100 around the table axis 21s, the processing mark T1 is continuous in the circumferential direction Dc (left-right direction on the paper surface in FIG. 6). Further, by performing the cutting by moving the tool 22 in the vertical direction Dv while rotating the casing forming member 100 around the table axis 21s, the processing mark T1 continuous in the circumferential direction Dc is formed in the vertical direction Dv (axial direction Da: up-down direction on the paper surface in FIG. 6) with a predetermined pitch width, and the boundaries thereof are remarkably observed.

Figure 7:
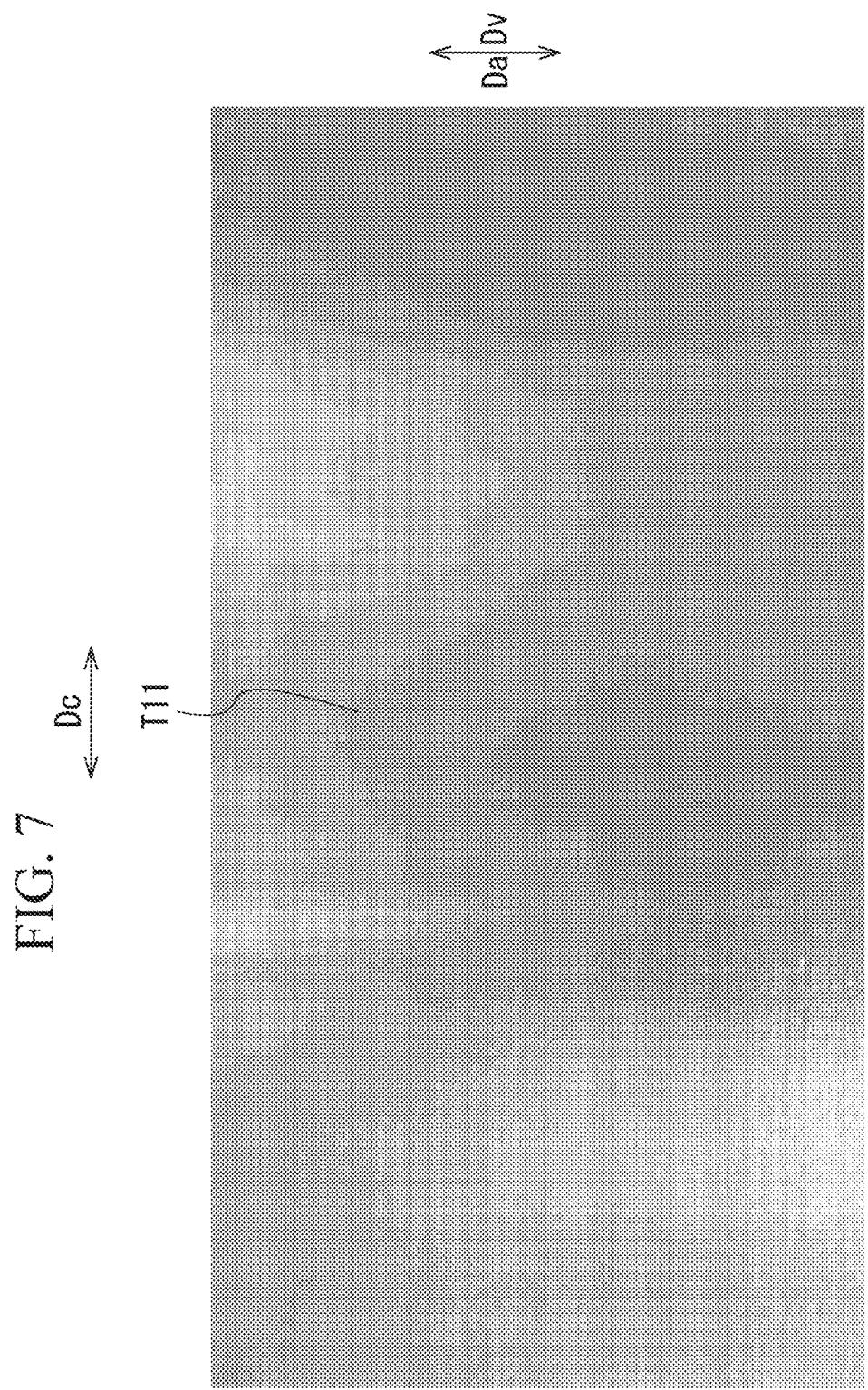
FIG. 7 is a reference view showing a processing mark generated by turning processing.

As a reference, in the case of the turning processing which is performed by rotating only the table 21 in a state in which the tool is fixed, a processing mark T11 as shown in FIG. 7 is formed. In the turning processing, cutting is performed while feeding the distal end of a tip attached to the fixed tool at a fine pitch. Therefore, the processing mark T11 has a linear cutting mark formed in the circumferential direction Dc, and is in a significantly different state from the processing mark T1 of the present embodiment.

Effects

In the manufacturing method S1 of the casing 5 which has the above configuration, the inner circumferential surface 101g of the casing body forming portion 101 is subjected to the cutting by the tool 22 being rotated about the tool axis 22s while rotating the table 21 about the table axis 21s together with the casing forming member 100, which is placed on the table 21. As a result, the relative displacement speed between the tool 22 and the inner circumferential surface 101g of the casing body forming portion 101 is the sum of the circumferential speed of the casing body forming portion 101 which rotates together with the table 21 and the circumferential speed of the tool 22 which rotates around the tool axis 22s. Therefore, by increasing the circumferential speed of the tool 22 around the tool axis 22s, it is possible to perform the cutting with high accuracy even in a case in which the circumferential speed of the casing forming member 100 around the table axis 21s is suppressed. As a result, even with the large casing 5, even in a case in which other heavy objects such as balance weights are not attached to the casing forming member 100 or installed on the table 21, the centrifugal force generated in the casing forming member 100 during the processing can be suppressed. As a result, even with the large casing 5, it is possible to suppress the processing time while suppressing the imbalance during the processing.

In the manufacturing method S1 of the casing 5 which has the above configuration, the rotation speed of the table 21 around the table axis 21s is lower than the rotation speed of the tool 22 around the tool axis 22s. Therefore, the circumferential speed of the casing forming member 100 around the table axis 21s can be suppressed to be low. As a result, the centrifugal force generated in the casing 5 during the processing can be suppressed more reliably. As a result, the tilting of the casing 5 during the processing can be suppressed, so that highly accurate processing that satisfies the required product accuracy (coaxiality) is possible.

In the manufacturing method S1 of the casing 5 which has the above configuration, the tool axis 22s of the tool 22 extends in the radial direction Dr to intersect with the table axis 21s by the head 52. Therefore, processing with the tool 22 can be performed with a high degree of freedom depending on the shape of the inner circumferential surface 101g of the casing body forming portion 101.

Modification Example of Embodiment

In the above embodiment, the tool 22 that rotates around the tool axis 22s which extends in the radial direction Dr is connected to the main spindle 51 via the head 52, but the tool 22 is not limited to being disposed in such a direction.

Figure 8:
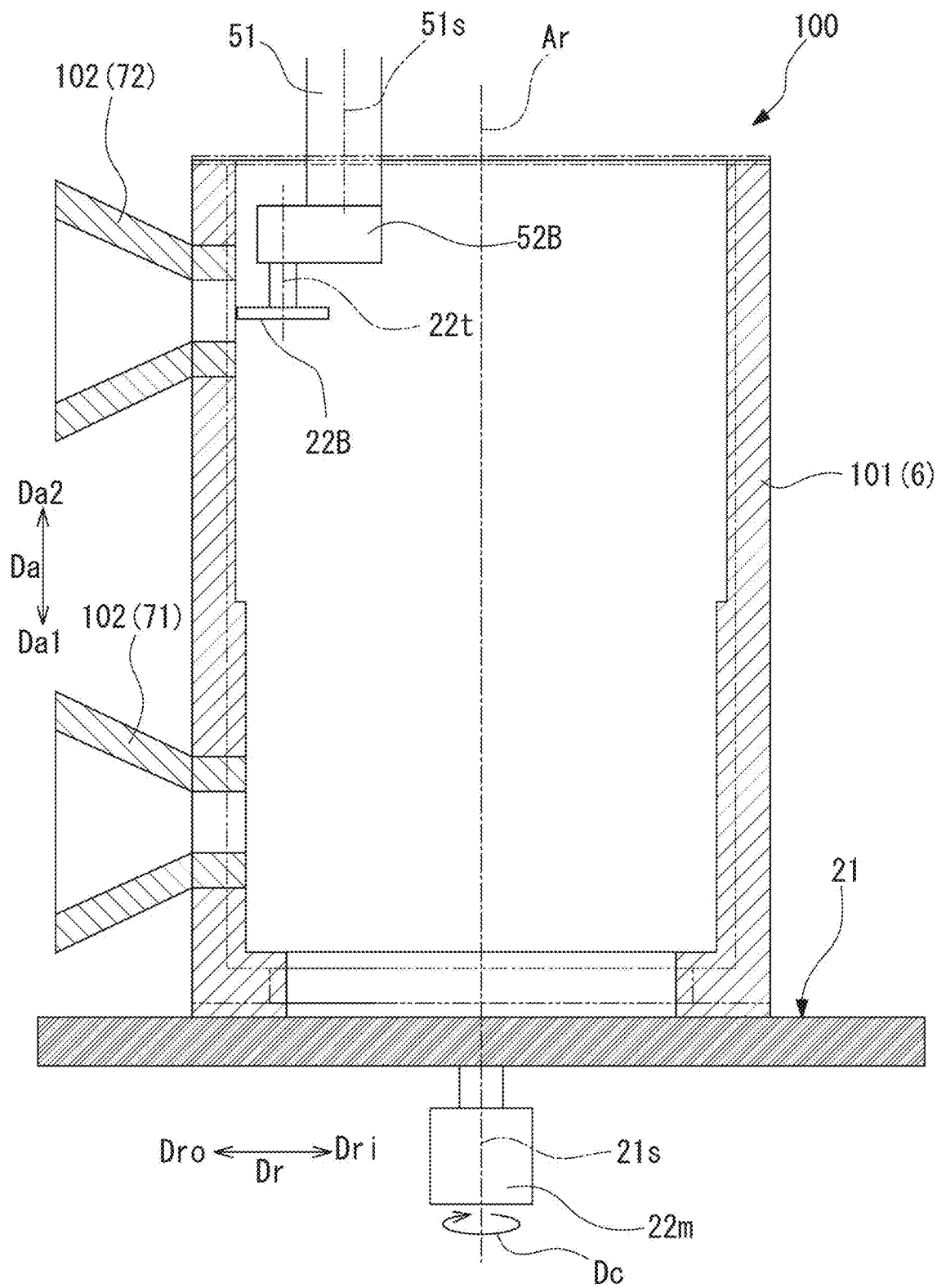
FIG. 8 is a view showing a modification example of a tool used in a modification example of the manufacturing method of the casing according to the embodiment of the present disclosure.

As shown in FIG. 8, a tool 22B is held by the main spindle 51 which extends in parallel with the table axis 21s via a head 52B. The tool 22B is held by the head 52B at a position offset in the radial direction Dr intersecting with the operation axis 51s of the main spindle 51. Specifically, the head 52B moves the position of a tool axis 22t in parallel with the operation axis 51s in the radial direction Dr like a universal attachment. As a result, in the modification example of the present embodiment, the tool axis 22t extends in parallel with the table axis 21s at a position deviated from the operation axis 51s in the radial direction Dr. The head 52B transmits the rotation of the main spindle 51 around the operation axis 51s to the tool axis 22t of the tool 22B via a gear (not shown) or the like.

Even in a case in which such a tool 22B is used, by the rotating tool 22, the cutting can be performed on the casing body forming portion 101 that rotates together with the table 21, as in the above embodiment. That is, the cutting can be performed by using the tool 22B that rotates about the tool axis 22t which extends in parallel with the table axis 21s at a position offset from the operation axis 51s of the main spindle 51. As a result, processing with the tool 22 can be performed with a high degree of freedom depending on the shape of the inner circumferential surface 101g of the casing body forming portion 101.

Further, in a case in which the head 52B of such a modification example is used, a processing mark T2 as shown in FIG. 9 is formed. The processing mark T2 is left with a scaly cutting mark by the tool 22B. Further, by rotating the casing forming member 100 around the table axis 21s, the processing mark T2 is continuous in the circumferential direction Dc (left-right direction on the paper surface in FIG. 9). Further, by performing the cutting by moving the tool 22 in the vertical direction Dv while rotating the casing forming member 100 around the table axis 21s, the processing mark T2 continuous in the circumferential direction Dc is formed in the vertical direction Dv (axial direction Da: up-down direction on the paper surface in FIG. 9) with a predetermined pitch width, and the boundaries thereof are remarkably observed.

OTHER EMBODIMENTS

An embodiment of the present disclosure has been described above with reference to the drawings, but the specific configuration is not limited to this embodiment, and includes design changes and the like without departing from the scope of the present disclosure.

In the above embodiment, the casing forming member 100 is processed by vertically inverting the first side Da1 in the axial direction Da and the second side Da2 in the axial direction Da, but the present disclosure is not limited to this. Depending on the size of the casing forming member 100, the casing forming member 100 may be processed without being vertically inverted.

Further, in the above embodiment, for example, the centrifugal compressor is shown as an example of the rotating machine 1, but the present disclosure is not limited to this. For example, the rotating machine 1 may be a steam turbine or the like.

Further, in the above embodiment, the procedure of the manufacturing method S1 of the casing 5 has been shown as an example, but the order thereof and the detailed work content in each step can be changed as appropriate.

Additional Notes

The manufacturing method S1 of the casing 5 according to the embodiment can be understood, for example, as follows.

(1) A manufacturing method S1 of a casing 5 according to a first aspect is the manufacturing method S1 of the casing 5 that includes a casing body 6 which is formed in a tubular shape that is centered on and extends along an axis Ar, and a suction nozzle 71 and a discharge nozzle 72 which protrude from the casing body 6 toward an outer side Dro in a radial direction Dr of the casing body 6 about the axis Ar as a reference and communicate with an inside of the casing body 6, the method including a step S2 of preparing a casing forming member 100 that includes a casing body forming portion 101 which is formed in a tubular shape and a protruding portion forming portion 102 which protrudes from the casing body forming portion 101 toward the outer side Dro in the radial direction Dr, a step S3 of placing the casing forming member 100 on a table 21 which is rotatable about a table axis 21s which extends in a vertical direction Dv and disposing a tool 22 which is rotatable about a tool axis 22s on an inner side Dri of the casing forming member 100 in the radial direction Dr, and a step S4 of forming the casing 5 by performing cutting an inner circumferential surface 101g of the casing forming member 100 with the tool 22 while rotating the table 21 about the table axis 21s together with the casing forming member 100 and rotating the tool 22 about the tool axis 22s.

As a result, the relative displacement speed between the tool 22 and the inner circumferential surface 101g of the casing body forming portion 101 is the sum of the circumferential speed of the casing body forming portion 101 which rotates together with the table 21 and the circumferential speed of the tool 22 which rotates around the tool axis 22s. Therefore, by increasing the circumferential speed of the tool 22 around the tool axis 22s, it is possible to perform the cutting with high accuracy even in a case in which the circumferential speed of the casing forming member 100 around the table axis 21s is suppressed. As a result, even in the large casing 5, the centrifugal force generated in the casing forming member 100 during the processing can be suppressed. As a result, even with the large casing 5, it is possible to suppress the processing time while suppressing the imbalance during the processing.

(2) The manufacturing method S1 of the casing 5 according to a second aspect is the manufacturing method S1 of the casing 5 according to (1), in which a rotation speed of the table 21 about the table axis 21s may be lower than a rotation speed of the tool 22 about the tool axis 22s.

As a result, the circumferential speed of the casing forming member 100 around the table axis 21s can be suppressed to be low. As a result, the centrifugal force generated in the casing 5 during the processing can be suppressed more reliably. As a result, it is possible to suppress the imbalance during the processing with high accuracy.

(3) The manufacturing method S1 of the casing 5 according to a third aspect is the manufacturing method S1 of the casing 5 according to (1) or (2), in which the tool axis 22s of the tool 22 may extend to intersect with the table axis 21s.

As a result, processing with the tool 22 can be performed with a high degree of freedom depending on the shape of the inner circumferential surface 101g of the casing body forming portion 101.

(4) The manufacturing method S1 of the casing 5 according to a fourth aspect is the manufacturing method S1 of the casing 5 according to (1) or (2), in which the tool axis 22t of the tool 22 may extend in parallel with the table axis 21s.

As a result, processing with the tool 22 can be performed with a high degree of freedom depending on the shape of the inner circumferential surface 101g of the casing body forming portion 101.

EXPLANATION OF REFERENCES

1: rotating machine
2: rotor
3: rotor body
4: impeller
5: casing
6: casing body
6g: inner circumferential surface
6s, 6t: end surface
21: table
21a: placing surface
21s: table axis
22, 22B: tool
22m: table drive mechanism
22s, 22t: tool axis
50: processing machine
51: main spindle
51s: operation axis
52, 52B: head
71: suction nozzle
72: discharge nozzle
100: casing forming member
101: casing body forming portion
101g: inner circumferential surface
102: protruding portion forming portion
201: first reference surface
202: second reference surface
Ar: axis
Da: axial direction
Da1: first side
Da2: second side
Dc: circumferential direction
Dr: radial direction
Dri: inner side
Dro: outer side
Dv: vertical direction S1: manufacturing method of casing
S2: step of preparing casing forming member
S3: step of placing casing forming member on table and disposing tool
S4: step of forming casing
T1, T2, T11: processing mark

What is claimed is:

1. A manufacturing method of a casing that includes a casing body which is formed in a tubular shape that is centered on and extends along an axis, and a suction nozzle and a discharge nozzle which protrude from the casing body toward an outer side in a radial direction of the casing body about the axis as a reference and communicate with an inside of the casing body, the method comprising:

a step of preparing a casing forming member that includes a casing body forming portion which is formed in a tubular shape and a protruding portion forming portion which protrudes from the casing body forming portion toward the outer side in the radial direction;

a step of placing the casing forming member on a table which is rotatable about a table axis which extends in a vertical direction and disposing a tool which is rotatable about a tool axis on an inner side of the casing forming member in the radial direction; and a step of forming the casing by performing cutting an inner circumferential surface of the casing forming member with the tool while rotating the table about the table axis together with the casing forming member and rotating the tool about the tool axis wherein the casing forming member is eccentric such that a center of gravity of the casing forming member deviates from the axis, wherein a rotation speed of the table about the table axis is lower than a rotation speed of the tool about the tool axis, wherein the rotation speed of the table is 0 rpm or more and 1 rpm or less, and wherein the casing forming member is placed on the table in a state in which the axis and the table axis coincide with each other.

2. The manufacturing method of a casing according to claim 1, wherein the tool axis of the tool extends to intersect with the table axis.

3. The manufacturing method of a casing according to claim 1, wherein the tool axis of the tool extends in parallel with the table axis.

4. The manufacturing method of a casing according to claim 1, wherein the rotation speed of the table is 0.1 rpm or more and 1 rpm or less.

* * * * *